United States Patent
Hommes et al.

(10) Patent No.: US 6,939,264 B2
(45) Date of Patent: Sep. 6, 2005

(54) METHOD FOR CONTROLLING A CONTINUOUSLY VARIABLE TRANSMISSION

(75) Inventors: Georg Hommes, Ingolstadt (DE); Rainer Ludwig, Nuremberg (DE); Ari Ojamies, Georgensgmuend (DE)

(73) Assignees: Conti Temic Microelectronic GmbH, Nuremberg (DE); Audi AG, Ingolstadt (DE)

( * ) Notice: Subject to any disclaimer, the term of this patent is extended or adjusted under 35 U.S.C. 154(b) by 0 days.

(21) Appl. No.: 10/471,534

(22) PCT Filed: Mar. 5, 2002

(86) PCT No.: PCT/EP02/02362

§ 371 (c)(1),
(2), (4) Date: Sep. 9, 2003

(87) PCT Pub. No.: WO02/073071

PCT Pub. Date: Sep. 19, 2002

(65) Prior Publication Data

US 2004/0092361 A1 May 13, 2004

(30) Foreign Application Priority Data

Mar. 10, 2001 (DE) .......................... 101 11 607

(51) Int. Cl.⁷ .......................... B60K 41/12; G06F 17/00
(52) U.S. Cl. .......................... 477/45; 701/61
(58) Field of Search .......................... 477/45, 46, 49; 701/61, 64

(56) References Cited

U.S. PATENT DOCUMENTS

| | | | | |
|---|---|---|---|---|
| 4,355,547 A | | 10/1982 | Poole et al. | |
| 4,466,521 A | * | 8/1984 | Hattori et al. | 477/46 |
| 4,663,990 A | * | 5/1987 | Itoh et al. | 477/43 |
| 4,827,803 A | * | 5/1989 | Miyawaki | 477/49 |
| 4,867,732 A | | 9/1989 | Soga et al. | |
| 5,131,297 A | * | 7/1992 | Yamashita et al. | 477/49 |
| 5,368,530 A | | 11/1994 | Sanematsu et al. | |
| 5,983,152 A | | 11/1999 | Genzel et al. | |
| 6,042,501 A | * | 3/2000 | Yamamoto | 477/48 |
| 6,165,101 A | | 12/2000 | Takizawa et al. | |
| 6,173,227 B1 | * | 1/2001 | Speicher et al. | 477/43 |
| 6,533,702 B1 | * | 3/2003 | Asyama et al. | 477/45 |

FOREIGN PATENT DOCUMENTS

| | | |
|---|---|---|
| DE | 4106471 | 8/1991 |
| EP | 0785381 | 7/1997 |

* cited by examiner

*Primary Examiner*—Roger Pang
(74) *Attorney, Agent, or Firm*—W. F. Fasse; W. G. Fasse

(57) ABSTRACT

The transmission ratio of a stepless transmission is adjusted in accordance with a selectable closed loop control strategy, whereby the transmission ratio is infinitely variable between two transmission ratio end values by actuator forces effective on axially adjustable bevel discs forming part of the stepless transmission. High end position forces on the bevel discs in their end positions are limited, yet the entire control range of the bevel discs may be used. For this purpose the transmission ratio is modulated in an end position operating mode by modulating the actuator forces that axially shift the bevel discs. The actuator forces are controlled in a closed loop manner.

5 Claims, 3 Drawing Sheets

METHOD FOR CONTROLLING A CONTINUOUSLY VARIABLE TRANSMISSION

FIELD OF THE INVENTION

The invention relates to a method for controlling a stepless transmission. Such transmissions are used, for example, in motor vehicles.

BACKGROUND INFORMATION

A method for controlling a stepless transmission used in a motor vehicle is known from German Patent Publication DE 41 06 471 A1. The transmission is thereby constructed as a looping transmission with two bevel disc gears and a looping belt, whereby the bevel disc wheels are coupled to one another through the looping belt. Each bevel gear disc comprises an axially displaceable bevel disk functioning as an adjustment means. The transmission ratio of the transmission can be adjusted in a stepless manner by a shifting of the adjustment means within a range that is limited by two transmission ratio end values. Hereby it is disadvantageous that a transmission ratio end values are depending on manufacturing tolerances and on wear and tear phenomena. Additionally, the transmission ratio end values can vary dynamically depending on the slip between the bevel disc gears and the looping belt so that the adjustment means are moved into end positions that are determined by mechanical displacement stop when the transmission is operating with a maximal or minimal transmission ratio. High end position forces are effective on the adjustment means in the end positions which have an adverse influence on the efficiency and the useful life of the transmission.

It is known from European Patent Publication EP 785,381 A1 that the running of the adjustment means into their mechanical end position is undesirable. Such an undesirable operation can be avoided in that a safety clearance to the transmission ratio end values is maintained, which, however has proven itself to be disadvantageous because an optimal operation with a maximum or minimum permissible transmission ratio is not possible for certain driving strategies.

SUMMARY OF THE INVENTION

It is an object of the invention to provide a method for controlling a continuously variable transmission so that the entire control range of the transmission can be used. This object has been achieved by limiting the end position forces that are effective on the transmission ratio shifting or adjustment members in their end positions. More specifically, the end position forces are controlled or limited according to the invention by the following steps:

a) generating at least one transmission ratio shifting actuator force that is effective on position shiftable transmission members (P2, S2) for shifting said transmission members and thus on the transmission ratio between two transmission end positions corresponding to two transmission ratio end values, b) defining an end position operating mode as an operating mode by performing the further steps of c) generating a power oscillation, d) first modulating said at least one actuator force with said power oscillation to vary a mean proportion of said at least one actuator force to provide a closed loop control signal, e) second modulating said transmission ratio in response to said first modulating so that said transmission ratio oscillates about a transmission ratio mean value, f) ascertaining a measured value ($a_M$) which depends on said second modulating of said transmission ratio (i), and represents a mean spacing between each of said position shiftable transmission members (S2, P2) and the respective end position, and g) controlling said measured value ($a_M$) in response to said closed loop control signal so that said measured value ($a_M$) corresponds to a predetermined rated value ($a_S$) whereby said at least one actuator force is limited when said position shiftable transmission members (S2, P1) move into a respective end Position.

According to the invention an end position operation mode is defined as an operating mode for the control of a stepless transmission. In the operating mode the transmission ratio of the transmission is modulated by the modulation of at least one actuator force that causes the adjustment of the transmission ratio. Further, a measured value is ascertained that depends on the modulation of the transmission ratio of the transmission, and the ascertained measured value is adjusted in a closed loop manner to a predetermined rated value by varying the mean actuator force or the mean actuator forces. More specifically, the measured value is adjusted by varying the equal proportion of the actuator force or of the equal proportion of the actuator forces.

The predetermined rated value ($a_S$) is advantageously selected so that at least one shiftable adjustment means, the displacement of which causes the adjustment of the transmission ratio of the transmission, is effective on a mechanical displacement stop with a predetermined mean force when the measured value is adjusted in closed loop fashion to the predetermined rated value.

In an advantageous further development of the present method a normal operation mode is defined in addition to the end position operation mode as a further operating mode of the transmission. In the normal operation mode the transmission ratio of the transmission is adjusted in a conventional manner to a value that depends on a selected closed loop control strategy. This adjustment can be accomplished either through the closed loop control of the transmission ratio, or of the r.p.m. of the motor that drives the transmission. The selection of the operating mode takes place dependent on the transmission ratio in such a way that the drive unit is operated in accordance with the end position operation mode for values within the range of the transmission ratio end values of the transmission and otherwise it is operated in the normal operating mode.

The advantages of the method according to the invention are seen particularly in the increasing of the efficiency of the transmission by the utilization of the full control range and in the avoidance of high end position forces that were effective in the end positions of the adjustment means. The high operational life of the transmission which results from the avoidance of high end position forces and from the resulting reduction of the mechanical loading of the components of the transmission is a further advantage. The method is best suitable for use in a motor vehicle with a stepless transmission.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
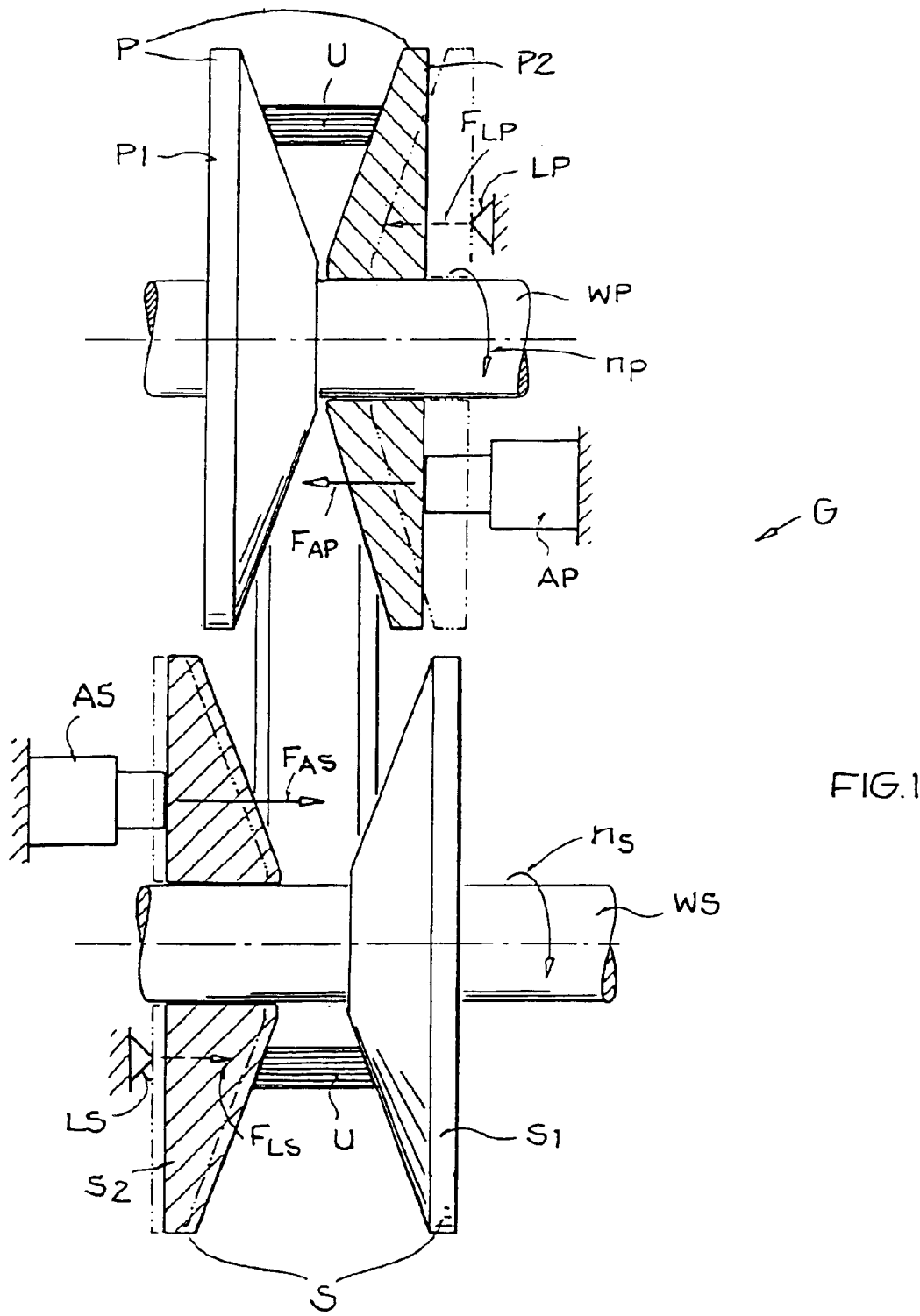
FIG. 1 shows a basic illustration of a stepless transmission.

The stepless transmission G shown in FIG. 1 is a component of a drive unit including the transmission G and an engine of a motor vehicle not shown. The transmission G comprises a primary shaft WP driven by the engine of the motor vehicle, a primary bevel disc wheel P connected with the primary shaft WP, a secondary shaft WS, a secondary bevel disc wheel S connected with the secondary shaft WS, and a looping belt U for example constructed as a thrust link belt. The looping belt loops around the two bevel disc wheels P and S and transmits the rotational motion of the primary bevel disc wheel P to the secondary bevel disc wheel S. The primary bevel disc wheel P comprises two bevel discs P1 and P2, whereby one of the bevel discs P1 is rigidly connected to the primary shaft WP and the other bevel disc P2 is axially shiftable on the primary shaft WP by the actuator force $F_{AP}$ of a primary actuator AP. The axial motion of the bevel disc P2 is limited by a symbolically indicated mechanical displacement stop LP.

When the shiftable bevel disc P2 is moved into its end position as indicated by dashed lines and as determined by the displacement limit stop LP, then the limit stop LP is effective on the bevel disc P2 with an end position force $F_{LP}$. Correspondingly, the secondary bevel disc wheel S comprises two bevel discs S1 and S2 of which one bevel disc S1 is rigidly connected to the secondary shaft WS while the other bevel disc S2 is shiftable along the secondary shaft WS by the actuator force $F_{AS}$ of a secondary actuator AS. The axial motion of the displaceable bevel disc S2 is thereby limited by the symbolically shown mechanical displacement stop SP When the displaceable bevel disc S2 is moved into its end position as determined by the displacement stop SP and as indicated by dashed lines, then the displacement stop SP is effective on the bevel disc S2 with an end position force $F_{LS}$. The spacing between the bevel discs of the respective bevel disc wheel P or S and thus the effective diameter of the looping belt U at the respective bevel disc wheel P or S is varied in a stepless manner by the stepless axial displacement of the bevel discs P2, S2. This stepless varying causes an infinite variation of the transmission ratio $i=n_P/n_S$ of the transmission G. That means, the ratio of the drive r.p.m. $n_S$ of the primary shaft WP to the output r.p.m. $n_S$ of the secondary shaft WS is infinitely variable. The axially displaceable bevel discs P2 and S2 thus constitute an adjustment means for controlling the transmission ratio i of the transmission G.

The actuator forces $F_{AP}$, $F_{AS}$ are transformed into forces which tension the looping belt U. The axial motions of the displaceable bevel discs P2 and S2 are coupled through these forces. These forces compensate one another at a constant transmission ratio i because the transmission G is then in a force equilibrium. When the transmission ratio i is constant, one thus obtains the following Equations for the forces that are effective in an axial direction on the displaceable bevel discs P2 and S2:

$$F_P = K \cdot F_S, \text{ wherein } F_P = F_{AP} + F_{LP}, \text{ and } F_S = F_{AS} + F_{LS},$$

whereby the forces $F_P$, and $F_S$ are the pressing forces which act on the displaceable bevel discs P2 or S2 and the factor K is a support force ratio which is a function of work point parameters, particularly a function of the transmitted torque moment, of the transmission ratio i, of the drive r.p.m. $n_P$, and of the pressing force. Further, a shift force $F_V$ is defined as follows:

$$F_V = K \cdot F_S - F_P = K \cdot (F_{AS} - F_{AP}) + K \cdot (F_{LS} - F_{LP}).$$

The shift force $F_V$ is composed of an actuator proportion $F_{VA} = K \cdot (F_{AS} - F_{AP})$ and an end position force proportion $F_{VL} = K \cdot (F_{LS} - F_{LP})$. This shift force $F_V$ is zero when the transmission ratio is constant. Otherwise it is not zero and determines the speed of the transmission ratio shifting. During the transmission shifting the actuator forces $F_{AP}$ and $F_{AS}$ are always adjusted in such a manner that certain required values are maintained for the pressing forces $F_P$ and $F_S$ while also maintaining a certain required value for the shift force $F_V$ whereby $F_V$ depends on the desired transmission shifting speed.

Since the axial displacement of the shiftable bevel discs P2, S2 is limited, the transmission ratio i can be varied only between a lower transmission ratio end value—namely the initial transmission ratio—and an upper transmission ratio value—namely the end transmission ratio—. The exact transmission ratio values, however, are not known because they are dependent on geometric characteristics of the transmission G, for example manufacturing tolerances or wear and tear occurring during operation and on the expansion of the looping belt U as well as on dynamic characteristics, for example the slip between the bevel gear wheels P and S and the looping belt U.

During the driving operation the driving r.p.m. $n_P$, that is the r.p.m. of the engine that drives the primary shaft WP, and the transmission ratio i of the transmission are adjusted in a closed loop manner to certain rated values that depend on the desire of the driver, on the driving situation and on a selected closed loop control strategy. In a certain driving situation it is desired to drive with a transmission ratio i that is as high as possible or as low as possible. Thus, it is possible to optimize with a small transmission ratio i the fuel consumption and the generation of noise of the motor vehicle while also optimizing the acceleration and climbing characteristics of the motor vehicle with a high transmission ratio. With a high or a low transmission ratio i, however, there is the danger that the transmission G is over-controlled, that means the displaceable bevel discs P2 or S2 are pressed with a high force into their end positions, whereby high end position forces $F_{LP}$ or $F_{LS}$ may occur. High end position forces $F_{LP}$, $F_{LS}$, however can lead to a reduction of the efficiency and of the useful life of the transmission G.

In order to avoid these disadvantages, a normal operation mode and an end position operation mode are defined as operating modes of the transmission, whereby during the normal operation mode a movement of the displaceable bevel discs P2, S2 into their end positions is undesirable and a motion of the displaceable bevel discs P2, S2 into their end position is permitted during the end position operation mode.

The operation modes are selected depending on the instantaneous transmission ratio i. For this purpose, advantageously, two transmission ratio threshold values are defined which are positioned between the transmission ratio end values. These two threshold values are the limits of a normal transmission ratio range. These transmission ratio threshold values are so defined that the displaceable bevel discs P2, S2 are certainly not moved into their end positions when the transmission ratio values i are within the normal transmission ratio range. When the transmission ratio values i are positioned in the normal transmission ratio range, the normal operation mode is selected while otherwise the end position operation mode is selected as the operating mode. It is, however, also possible to define transmission ratio threshold bands instead of transmission ratio threshold values. In that case a switching from one of the operation modes into the other takes place only when, in response to a change of the transmission ratio i one of the transmission ratio threshold bands has been fully passed through. Thus, one obtains a hysteresis shaped switching characteristic which prevents a continuous switch over of the operation modes when the transmission ratio values i are within the range of the transmission ratio threshold values.

During the normal operation mode the drive unit is controlled in a conventional manner. More specifically, the transmission ratio i of the transmission G is intentionally controlled in closed loop fashion or the control is achieved by the closed loop control of the r.p.m. $n_P$, whereby the respective closed loop control is performed depending on the driving situation, the selected driving strategy, and on the driver's wishes as expressed by the driver through the operation of the gas pedal. Contrary thereto, in the end position operation mode the actuator forces $F_{AP}$, $F_{AS}$ are controlled in closed loop fashion in such a manner that just still permissible end position forces $F_{LP}$, $F_{LS}$ occur.

Figure 2:
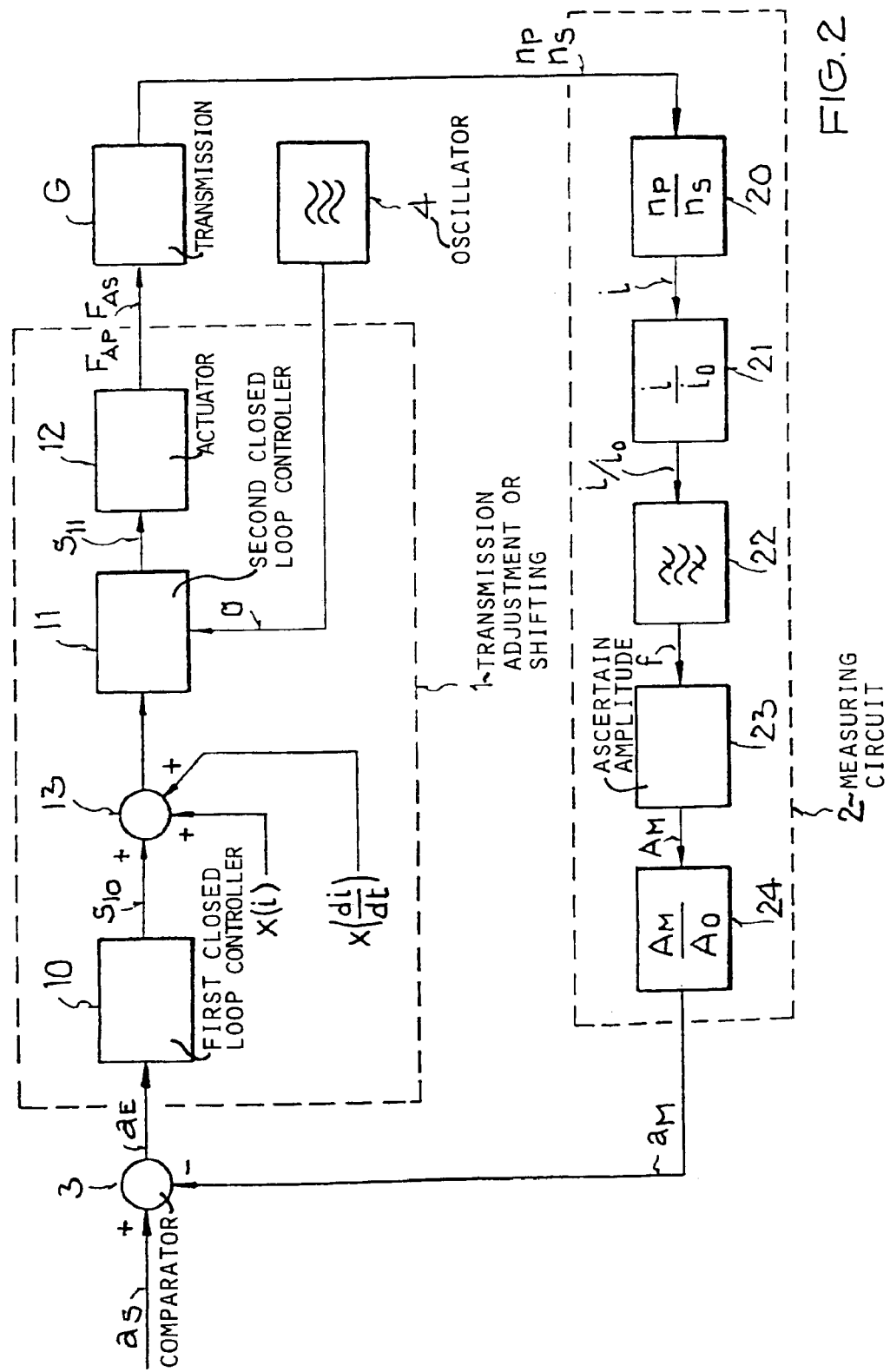
FIG. 2 shows a function block diagram of a closed loop control circuit by means of which the transmission ratio of the transmission according to FIG. 1 is controlled in closed loop fashion in an end position operation mode.

For this purpose a closed loop control during the end position operation mode is performed according to the functional circuit block diagram shown in FIG. 2. The function block diagram shows a closed loop control circuit with the transmission G forming the controlled system and including a measuring circuit or device 2, an adjustment or transmission shifting member 1, and a rated value comparator 3. In the closed loop control performed by this closed loop control circuit, the drive r.p.m $n_R$ and the output r.p.m. $n_S$ of the transmission G are measured with suitable sensors and evaluated in the measuring circuit or device 2. The measuring circuit or device 2 delivers a measured value $a_M$ as the result of the evaluation. The measured value $a_M$ is a measure for the mean end position forces $F_{LP}$, $F_{LS}$ that are effective on the displaceable bevel discs P2, S2. Then the measured value $a_M$ is compared in the rated value comparator 3 with a rated value $a_S$ which is, for example, provided by a control device. The result of this comparing, namely the closed loop deviation $a_E$, is supplied to the adjustment or transmission shifting member 1 which controls the actuator forces $F_{AP}$, $F_{AS}$ that are effective on the displaceable bevel discs P2, S2 in accordance with the closed loop deviation $a_E$.

The adjustment member 1 comprises a first closed loop controller 10, a second closed loop controller 11 and an actuator unit 12. The actuator unit is constructed, for example as an electrohydraulic transducer including actuators AP and AS. The first adjustment member 10 produces a first adjustment signal $S_{10}$ based on the closed loop control deviation $a_E$. The first adjustment signal $S_{10}$ corresponds to the rated value of the actuator proportion $F_{VA}$ of the desired shift force $F_V$. Optionally, a feed-forward signal x(i) and/or a feed-forward signal x(di/dt) can be superimposed on the first adjustment signal $S_{10}$ for example through a summing circuit 13. The feed-forward signal x(i) is dependent on the transmission ratio i. The feed-forward signal x(di/dt) is dependent on the time variation di/dt of the transmission ratio i. The superposition of these feed-forward signals x(i), x(di/dt) is performed, however only for certain time durations and only when a large closed loop control deviation $a_E$ exceeding a certain value occurs. Such large closed loop control deviations $a_E$ may, for example, be caused by a rapid actuation of the gas pedal.

The first adjustment signal $S_{10}$ and, if applicable, the feed-forward signals x(i) and/or x(di/dt) as well as an oscillator signal o periodically generated by an oscillator 4 are supplied as input signals to the second closed loop controller 11. The second closed loop controller 11 produces from these signals at least one further control signal $S_{11}$ which signal or signals is used to control the actuators AP, AS of the actuator unit 12 and thus for controlling the actuator forces $F_{AP}$, $F_{AS}$, which are effective on the displaceable bevel discs P2, S2. The oscillator 4 thereby causes a modulation of the actuator forces $F_{AP}$, $F_{AS}$, more specifically, a force oscillation is imposed by the oscillation signal o on the actuator forces $F_{AP}$, $F_{AS}$. Thus, the actuator proportion $F_{VA}$ of the shift force $F_V$ is composed of a mean value and an oscillation proportion having an oscillation amplitude $A_o$ caused by the oscillator signal o. The oscillation proportion causes thereby an oscillation shift of the shiftable bevel discs P2, S2 and thus a respective modulation of the transmission ratio i. The modulation of the actuator forces $F_{AP}$, $F_{AS}$ is accomplished by the selection of the oscillation amplitude $A_o$ and the oscillator frequency in such a manner that the resulting modulation of the transmission ratio i is not noticed by the driver or at least it is not noticed as a disturbance.

The modulation of the transmission ratio i, that is the amplitude with which the transmission ratio i oscillates about its mean value in response to the modulation of the actuator forces $F_{AP}$, $F_{AS}$, depends on whether the displaceable bevel discs P2, S2 are moved into their end positions, which causes a damping of the oscillation. The modulation of the transmission ratio i is thus a measure for the mean spacing of the displaceable bevel discs P2, S2 from their respective end positions and thus a measure for the mean end position forces $F_{LP}$, $F_{LV}$ that are effective on the displaceable bevel discs P2, S2 or a measure of the mean end position force proportion $F_{VL}$ of the shift force $F_V$. As stated above, the measured value $a_M$ is a measure for the mean end positioning forces $F_{LP}$ and $F_{LS}$. It follows, that the measured value $a_M$ is also a measure for the mean spacing of the displaceable bevel discs P2, S2 from their respective end positions.

This measure is ascertained as the above mentioned measured value $a_M$ through the measuring device 2 from the drive r.p.m. $n_P$ and the output r.p.m. $n_S$ of the transmission G. The measuring device 2 comprises for this purpose a transmission ratio ascertaining device 20 which ascertains the transmission ratio i from the drive r.p.m. $n_P$ and from the output r.p.m. $n_S$. The measuring device 2 further comprises a transmission ratio normalization unit 21 which normalizes the transmission ratio i to a transmission ratio normalization value $i_o$, a bandpass device 22 which ascertains from the normalized transmission ratio signal $i/i_o$ the signal components that originate from the oscillator signal o. The measuring device 2 further comprises an amplitude ascertaining device 23 which ascertains the oscillation amplitude $A_N$ of the transmission ratio i from the signal f provided by a bandpass device 22, for example by rectifying and then filtering through a low pass filter. The measuring device 2 further comprises an amplitude normalization device 24 which forms the measured value $a_M$ as a result of a normalization of the oscillation amplitude $A_M$ of the transmission ratio i to an oscillation amplitude $A_O$ of the actuator proportion $F_{VA}$ of the shift force $F_V$.

In cases in which the oscillation proportion of the transmission ratio i, stemming from the oscillator signal o, shows a plurality of signal components having different frequencies, the bandpass device 22 may comprise a path range for each of these signal components. These signal components may, for example, correspond to a signal component of the base harmonic frequency of the oscillator frequency and to further signal components corresponding to harmonic frequencies of the base harmonic frequency. The amplitude of each signal component that has been passed by the band pass device 22 is then weighted with a respective defined factor in the amplitude ascertaining device. Subsequently, the weighted signals are summed to a signal which is supplied to the amplitude normalization device 24 as an oscillation amplitude $A_M$ of the transmission ratio i.

It is possible not to use the transmission ratio normalization device 21 and the amplitude normalization device 24. However, not using these devices results in a substantial effort and expense when the closed loop control circuit is to be adapted to different types of transmissions.

The closed loop control circuit varies the mean proportion of the actuator forces in such a way that the measured value $a_M$ is controlled in a closed loop manner to the rated value $a_S$. The rated value $a_S$ is thereby selected in such a way that the damping of the oscillation of the transmission ratio i is recognized with certainty when the measured value $a_M$ has been adjusted. The rated value $a_{AS}$ is further selected so that the then effective mean end position force $F_{LP}$ or $F_{LS}$ is as small as possible when the measured value $a_M$ has been adjusted. The measured value $a_M$ is thus controlled in closed loop fashion to a value at which a predetermined and still permissible value is obtained for the mean end position force $F_{LP}$ or $F_{LS}$.

Figure 3:
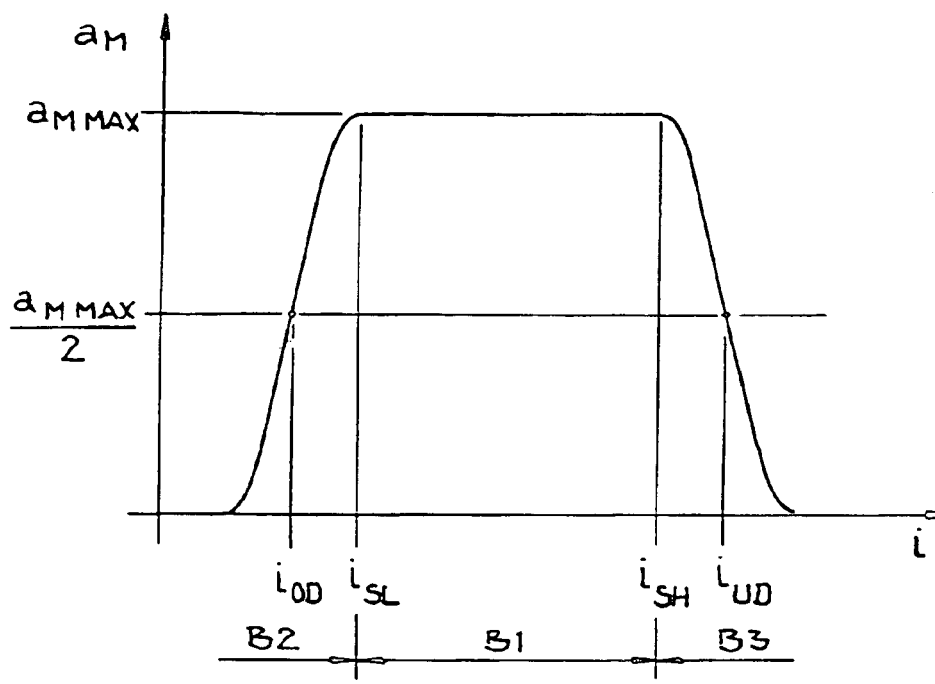
FIG. 3 shows a diagram of a measured value ascertained with the closed loop control circuit of FIG. 2 as a function of the transmission ratio of the transmission.

FIG. 3 shows the curve of the measured value $a_M$ as a function of the mean proportion of the transmission ratio i. The entire transmission ratio range is divided into three sections B1, B2, B3 by the two transmission ratio threshold values $i_{SL}$, $i_{SH}$. The section B1 between the transmission ratio threshold values $i_{SL}$, $i_{SH}$ thereby represents the normal transmission ratio range in which the transmission G is operated in the normal operation mode. The section B2 below the normal transmission ratio section B1 represents a lower end position transmission ratio zone. The section B3 above the normal transmission ratio zone B1 represents an upper end position transmission ratio zone. The drive unit is driven in the end position operation mode in these lower and upper end position zones. In the following a distinction is made in the end position operation mode between transmission ratio values i in the lower end position transmission section B2 and end position transmission values i in the upper end position transmission section B3. An overdrive operation is involved in the lower section B2 and an underdrive operation is involved in the upper section B3.

In the normal transmission ratio section B1 the measured value $a_M$ assumes its maximum value $a_{MMAX}$ because due to the modulation of the actuator forces $F_{AP}$, $F_{AS}$ none of the displaceable bevel discs P2, S2 reach their respective end position. Thus, the oscillation of the transmission ratio i is not damped. The end position force proportion $F_{VL}$ of the shift force $F_V$ is then equal to zero.

In the lower end position transmission ratio section B2, that is during overdrive operation, the end position force proportion $F_{VL}$ of the shift force $F_V$ is not equal to zero because the displaceable bevel disc S2 of the secondary bevel disc wheel S is moved into its end position by the modulation of the actuator forces $F_{AO}$, $F_{AS}$. This modulation entails a damping of the vibration component of the transmission ratio i. The damping expresses itself in a reduction of the measured value $a_M$ while the transmission ratio i decreases.

Correspondingly, the end position force proportion $F_{VL}$ of the shift force $F_V$ is also not zero for transmission ratio values in the upper end position section B3, that is, during an underdrive operation. This is so, because now in this case the displaceable bevel disc P2 of the primary bevel disc wheel P is moved into its end position by the modulation of the actuator forces $F_{AP}$, $F_{AS}$. In turn, such modulation entails a damping of the oscillation proportion of the transmission ratio i. The damping expresses itself in a reduction of the measured value $a_M$ while the transmission ratio i increases.

It has been found to be advantageous to adjust the measured value $a_M$ in a closed loop control in the end position operation mode to the rated value $a_S = a_{MMAX}/2$. With such a rated value $a_S$ the steepness of the $a_S(i)$ curve is high so that small fluctuations of the transmission ratio i can be rapidly recognized and controlled in closed loop fashion. Additionally, the mean end position force $F_{LP}$ or $F_{LS}$ is so small that it can be regarded as permissible because its negative effect on the efficiency and on the useful life of the transmission G is of an acceptable size.

The transmission ratio values $I_{OD}$ and $I_{UD}$, which one obtains in the end position operation mode when the measured value $a_M$ is controlled in closed loop fashion to the predetermined rated value $a_S$, represent the maximally or minimally permissible transmission ratio values, that is, they represent the control limits of the transmission G. These control limits $I_{OD}$, $I_{UD}$ can be ascertained with the described method whereby these limits can be adapted to the varying operational conditions. For this purpose a test is made, when the measured value $a_M$ is achieved by the closed loop control, whether certain operational conditions are present. For example, a test is made whether the motor moment supplied by the engine to the transmission G, is within a certain range that is selected depending on the transmission ratio i. Thus, advantageously a test is made whether the motor moment is within the range of –10 Nm to 10 Nm during an underdrive operation and whether it is larger than 50 Nm during an overdrive operation. If this is so, the mean value of the actually ascertained transmission ratio i is stored as an upper control limit $i_{UD}$ in the case of an underdrive operation, and as a lower control limit $I_{OD}$ in the case of an overdrive operation. Advantageously, these method steps are repeated several times and the control limits valid at respective different points of time are put into an intermediate storage. The upper or lower control limit $i_{UD}$ or $i_{OD}$ valid for the actual point of time is then obtained by averaging the respective intermediately stored control limits. This averaging increases the measuring accuracy since noise components are being suppressed.

The control limits $i_{UD}$ and $i_{OD}$ can be used for defining the normal transmission ratio section B1. Thus, it is possible to define the normal transmission ratio section B1 as a range positioned between the control limits $i_{UD}$, $i_{OD}$, whereby the limits of the section B1, namely $i_{SH}$, $i_{SL}$ are spaced respectively by a defined value from the upper or lower control limits $i_{UD}$ or $i_{OD}$.

The control limits $i_{UD}$, $i_{OD}$ are advantageously used in the closed loop control circuit of FIG. 2 as transmission ratio normalization value $i_o$ to which the transmission ratio i is normalized in the transmission normalization device 21. Thereby the transmission normalization value $i_o$ is first set to a suitably selected initiation value when the closed loop control circuit is put into operation. After the actual control limits $iU_{UD}$, $i_{OD}$ have been ascertained, the lower control limit $i_{UD}$ is used as a transmission normalization value $i_o$ when overdrive operation prevails. The upper control limit $i_{UD}$ is used as a transmission ratio normalization value $i_U$ when underdrive operation prevails.

What is claimed is:

1. A method for closed loop controlling a stepless transmission (G) having a transmission ratio that is continuously variable between two transmission ratio end values, said method comprising the following steps:
   a) generating at least one transmission ratio shifting actuator force that is effective on position shiftable transmission members (P2, S2) for shifting said transmission members and thus on the transmission ratio between two transmission end positions corresponding to two transmission ratio end values,
   b) defining an end position operating mode as an operating mode by performing the further steps of
   c) generating a power oscillation,
   d) first modulating said at least one actuator force with said power oscillation to vary a mean proportion of said at least one actuator force to provide a closed loop control signal,
   e) second modulating said transmission ratio in response to said first modulating so that said transmission ratio oscillates about a transmission ratio mean value,
   f) ascertaining a measured value ($a_M$) which depends on said second modulating of said transmission ratio (i) and represents a mean spacing between each of said position shiftable transmission members (S2, P2) and the respective end position, and
   g) controlling said measured value ($a_M$) in response to said closed loop control signal so that said measured value ($a_M$) corresponds to a predetermined rated value ($a_S$), whereby said at least one actuator force is limited when said position shiftable transmission members (P, S) move into a respective end position.

2. The method of claim 1, further comprising predetermining said rated value ($a_S$) in such a way that at least one of said position shiftable transmission members (P2, S2) bears against a stop with a predetermined mean force provided by said limited actuator force.

3. The method of claim 1, wherein a normal operation mode is defined as a further operation mode, and controlling the transmission ratio (i) of the transmission (G) or the drive r.p.m. ($n_P$) of the transmission (G) in a closed loop manner in accordance with a predetermined control strategy, operating the transmission (G) in said end position operating mode when values of the transmission ratio (i) are in a range of said transmission ratio end values, and operating said transmission in said normal or further operation mode outside said range of said transmission ratio end values.

4. The method of claim 2, wherein a normal operation mode is defined as a further operation mode, and controlling the transmission ratio (i) of the transmission (G) or the drive r.p.m. ($n_P$) of the transmission (G) in a closed loop manner in accordance with a predetermined control strategy, operating the transmission (G) in said end position operating mode when values of the transmission ratio (i) are in a range of said transmission ratio end values, and operating said transmission (G) in said normal or further operation mode outside said range of said transmission ratio end values.

5. Controlling a drive unit of a motor vehicle having a stepless transmission by performing the following steps:
   a) generating at least one transmission ratio shifting actuator force that is effective on position shiftable transmission members (P2, S2) for shifting said transmission members and thus on the transmission ratio between two transmission end positions corresponding to two transmission ratio end values,
   b) defining an end position operating mode as an operating mode by performing the further steps of
   c) generating a power oscillation,
   d) first modulating said at least one actuator force with said power oscillation to vary a mean proportion of said at least one actuator force to provide a closed loop control signal,
   e) second modulating said transmission ratio in response to said first modulating so that said transmission ratio oscillates about a transmission ratio mean value,
   f) ascertaining a measured value ($a_M$) which depends on said second modulating of said transmission ratio (i) and represents a mean spacing between each of said position shiftable transmission members (S2, P2) and the respective end position, and
   g) controlling said measured value ($a_M$) in response to said closed loop control signal so that said measured value ($a_M$) corresponds to a predetermined rated value ($a_S$), whereby said at least one actuator force is limited when said position shiftable transmission members (P, S) are in a respective end position.

* * * * *

UNITED STATES PATENT AND TRADEMARK OFFICE
CERTIFICATE OF CORRECTION

PATENT NO. : 6,939,264 B2
DATED : September 6, 2005
INVENTOR(S) : Hommes et al.

It is certified that error appears in the above-identified patent and that said Letters Patent is hereby corrected as shown below:

<u>Title page,</u>
Item [73], Assignees, after "Conti Temic" replace "Microelectronic" by
-- microelectronic --.

<u>Column 1,</u>
Line 28, after "displacement" replace "stop" by -- stops --.

<u>Column 2,</u>
Line 9, before "whereby" replace "$(a_s)$" by -- $(a_s)$, --.
Line 11, after "respective end" replace "Position" by -- position --.

<u>Column 3,</u>
Line 39, after "stop" replace "SP When" by -- SP. When --.
Line 50, after "r.p.m." replace "$n_s$" by -- $n_p$ --.
Line 65, after "the forces" replace "$F_p$," by -- $F_p$ --.

<u>Column 4,</u>
Line 3, after "r.p.m." replace "$n_p$," by -- $n_p$ --.

<u>Column 6,</u>
Line 6, after "control signal" replace "$S_{11}$" by -- $S_{11}$, --.
Line 9, before "which are" replace "$F_{AS}$," by -- $F_{AS}$ --.
Line 55, after "amplitude" replace "$A_N$" by -- $A_M$ --.

UNITED STATES PATENT AND TRADEMARK OFFICE
CERTIFICATE OF CORRECTION

PATENT NO. : 6,939,264 B2
DATED : September 6, 2005
INVENTOR(S) : Hommes et al.

It is certified that error appears in the above-identified patent and that said Letters Patent is hereby corrected as shown below:

Column 8,
Line 67, add
-- Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. --.

Signed and Sealed this

Twenty-first Day of February, 2006

JON W. DUDAS
*Director of the United States Patent and Trademark Office*